United States Patent
Liang

(10) Patent No.: US 9,338,621 B2
(45) Date of Patent: May 10, 2016

(54) MOBILE TERMINAL-BASED WEBPAGE LAYOUT METHOD AND APPARATUS

(75) Inventor: Jie Liang, Guangzhou (CN)

(73) Assignee: GUANGZHOU UCWEB COMPUTER TECHNOLOGY CO., LTD, Guangzhou (CN)

(*) Notice: Subject to any disclaimer, the term of this patent is extended or adjusted under 35 U.S.C. 154(b) by 114 days.

(21) Appl. No.: 14/119,696

(22) PCT Filed: May 22, 2012

(86) PCT No.: PCT/CN2012/075873
§ 371 (c)(1),
(2), (4) Date: Feb. 4, 2014

(87) PCT Pub. No.: WO2012/159563
PCT Pub. Date: Nov. 29, 2012

(65) Prior Publication Data
US 2014/0179287 A1  Jun. 26, 2014

(30) Foreign Application Priority Data

May 23, 2011  (CN) .......................... 2011 1 0134825

(51) Int. Cl.
| | |
|---|---|
| H04L 29/08 | (2006.01) |
| H04M 3/00 | (2006.01) |
| H04W 4/18 | (2009.01) |
| G06F 17/30 | (2006.01) |

(52) U.S. Cl.
CPC .......... H04W 4/18 (2013.01); G06F 17/30905 (2013.01)

(58) Field of Classification Search
None
See application file for complete search history.

(56) References Cited

U.S. PATENT DOCUMENTS

| 7,065,704 B1* | 6/2006 | Xu .................................. 715/205 |
| 2005/0097444 A1* | 5/2005 | Ivarsey et al. ............... 715/501.1 |
| 2008/0133647 A1* | 6/2008 | Hamzeh ......................... 709/202 |
| 2008/0139191 A1* | 6/2008 | Melnyk et al. ................. 455/419 |
| 2010/0029340 A1* | 2/2010 | Klassen ............ G06F 17/30905 455/566 |
| 2012/0096344 A1* | 4/2012 | Ho et al. ........................ 715/249 |

FOREIGN PATENT DOCUMENTS

WO  WO 2004031994 A1 * 4/2004 .............. G06F 17/30

* cited by examiner

Primary Examiner — Marivelisse Santiago Cordero
Assistant Examiner — Moustapha Diaby
(74) Attorney, Agent, or Firm — Annova Law Group, PLLC

(57) ABSTRACT

The invention provides a mobile terminal based layout method, including rearranging a WWW (world wide web) webpage with PC-based layout according to the following layout rules: based on WWW webpage PC-based layout rules, keeping a width of a block element unchanged, and wrapping an inline element inside the block element onto a next line in a screen width of the mobile terminal; and displaying the webpage that is rearranged according to the above rules on the mobile terminal. By using the present invention, not only overall layout of the webpage remains a main display style of the PC-based layout, but local region of the webpage is adjusted to adapt to a mobile phone screen, so that contents such as characters can be continuously displayed within the mobile phone screen. The PC-based layout and the display of the mobile terminal are perfectly combined together, thus ensuring the users to browse the Internet on the mobile terminal more conveniently without changing their browsing habit.

13 Claims, 3 Drawing Sheets

Bureau of Statistics releases a new program: average housing price increase rate will no longer be released http://news.sina.com 02/16/2011 16:40 Xinhuanet Xinhua News: National Bureau of Statistics (NBS) will start to implement a new housing sales price statistics system in January 2011. "Survey Program on Sales Prices of Residential Buildings" was released on 1/16/2011. According to the new Survey Program, NBS will release January Sales Price data of Residential Buildings for 70 Large and Medium-Sized Cities on February 18, 2011.
    The adjustments in the new housing price survey program includes: adjustment of data collection, adjustment of survey indicators, adjustment of index calculation methods and adjustment of data release time and method.
    Sales prices of residential buildings index is adjusted to Sales Prices of New Residential Buildings index and Sales Prices of Second-Hand Residential Buildings index. New residential buildings include affordable housing category and

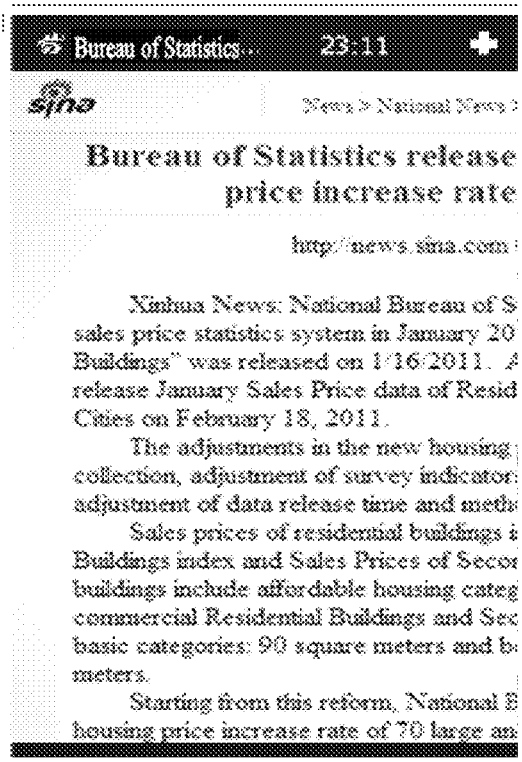

FIG. 3a

Bureau of Statistics releases a new program: average housing price increase rate will no longer be released http://news.sina.com 02/16/2011 16:40 Xinhuanet Xinhua News: National Bureau of Statistics (NBS) will start to implement a new housing sales price statistics system in January 2011. "Survey Program on Sales Prices of Residential Buildings" was released on 1/16/2011. According to the new Survey Program, NBS will release January Sales Price data of Residential Buildings for 70 Large and Medium-Sized Cities on February 18, 2011.

The adjustments in the new housing price survey program includes: adjustment of data collection, adjustment of survey indicators, adjustment of index calculation methods and adjustment of data release time and method.

Sales prices of residential buildings index is adjusted to Sales Prices of New Residential Buildings index and Sales Prices of Second-Hand Residential Buildings index. New residential buildings include affordable housing category and

FIG. 3b

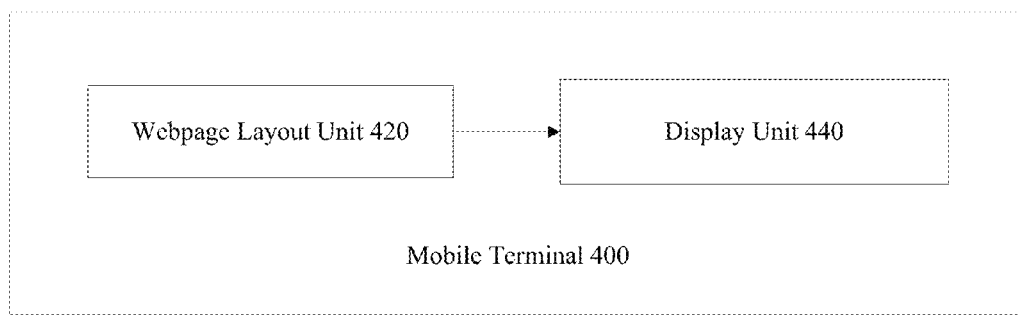

FIG. 4

MOBILE TERMINAL-BASED WEBPAGE LAYOUT METHOD AND APPARATUS

FIELD OF THE INVENTION

The present invention generally relates to mobile network webpage browsing technology field and, more particularly, to mobile terminal based webpage layout methods and apparatuses.

BACKGROUND

With the progress of society and the development of technologies, people are increasingly using access terminals to wirelessly connect to the Internet to obtain information. However, currently, WWW (world wide web) webpage layouts and displays are designed for personal computers (PC). This layout method is called PC-based layout method. As display screen of a mobile terminal (i.e., a mobile phone) is often far smaller than the display screen of a usual PC, before a WWW webpage with PC-based layout is browsed on the mobile terminal (e.g., a mobile phone), the WWW webpage with PC-based layout needs to be rearranged to adapt to the display of the mobile terminal.

Typically, in the PC-based layout style of a WWW webpage, Cascading Style Sheet (CSS) is used to design the webpage format, therefore enabling the separation of webpage content from webpage presentation. Webpage content of a WWW webpage is stored in a Hypertext Markup Language (HTML) file, whereas CSS rules for defining presentation semantics are stored in another file or part of the HTML file, typically the head of the file.

HTML elements of a WWW webpage include block elements and inline elements. Block elements are responsible for the overall layout of the webpage (i.e., the overall layout of a webpage is divided into a certain number of regional blocks). A block element is used as a container element for grouping other elements. The block element usually starts with a new line and can contain inline elements and other block elements, such as <div>, <p>, <h>, and so on. The most common block element is <p> for creating a paragraph. Inline elements are mainly responsible for content and information of the webpage. Inline elements, such as <a>, <img>, text, and so on, are semantic-level basic elements. An inline element can only contain text or other inline elements.

As the display screen of the mobile terminal, especially a mobile phone, often far smaller than the display screen of the PC, and no mouse is configured for the mobile terminal, it is far less convenient when a user operates the mobile terminal comparing to operating the PC.

Therefore, if the mobile terminal displays the WWW webpage strictly according to the PC-based layout, it may cause relatively large adverse effects on the webpage display and user's operational experience. For example, a user needs to scroll a webpage left or right to view complete webpage content. Even in an area of continuous text within a block, when the width of the text is larger than the width of the mobile phone screen, the user needs to scroll the text left or right to view the complete content. In order to solve this technical problem, in existing technologies, before the WWW webpage with PC-based layout is browsed on the mobile terminal (i.e., a mobile phone), the WWW webpage with PC-based layout is rearranged to adapt to the display of the mobile terminal. Before the mobile terminal browser displays a WWW webpage, webpage content is separated completely from the PC-based layout format, and the webpage content is rearranged. So the whole webpage format is changed and is not constituted by regional blocks of the webpage with PC-based layout any more. Because the webpage layout is rearranged in a wide range, on the one hand, data processing tasks are greatly increased and processing capabilities of the mobile terminal or the processor are consumed excessively; on the other hand, the display of the webpage that is rearranged completely to adapt to the display of the mobile terminal is quite different from the display of the webpage with PC-based layout, the user who is used to PC-based layout may feel unaccustomed or inconvenienced, affecting the user's browsing experience.

BRIEF SUMMARY OF THE INVENTION

In view of the above problems, the present invention combines original WWW webpage display effect with a mobile terminal's actual features, i.e., a small screen, inconvenient to operate. The present invention provides a completely new mobile terminal based webpage layout method and apparatus by combing PC-based layout with mobile terminal's browsing features for a mobile terminal browser.

One aspect of the present invention is to provide a mobile terminal based webpage layout method. The method includes:

A WWW webpage with PC-based layout is rearranged according to the following layout rules:

Based on WWW webpage PC-based layout rules, keeping a width of a block element unchanged, and wrapping an inline element inside the block element onto a next line in a screen width of the mobile terminal; and The webpage that is rearranged according to the above rules is displayed on the mobile terminal.

Another aspect of the present invention is to provide a mobile terminal, including a webpage layout unit and a display unit, where:

The webpage layout unit is configured to rearrange a WWW webpage with PC-based layout according to the following layout rules:

Based on WWW webpage PC-based layout rules, keeping a width of a block element unchanged, and wrapping an inline element inside the block element onto a next line in a screen width of the mobile terminal; and The display unit is configured to display the webpage that is rearranged by the webpage layout unit on the mobile terminal.

Another aspect of the present invention is to provide a mobile terminal based webpage layout server, including a webpage layout unit and a data transfer unit, where:

The webpage layout unit is configured to rearrange a WWW webpage with PC-based layout according to the following layout rules:

Based on WWW webpage PC-based layout rules, keeping a width of a block element unchanged, and wrapping an inline element inside the block element onto a next line in a screen width of the mobile terminal; and The data transfer unit is configured to, based on a webpage browsing request from the mobile terminal, receive a webpage from a third party and send the webpage that is rearranged by the webpage layout unit to the mobile terminal.

By using the above described mobile terminal based webpage layout method and apparatus according to the present invention, a main display style of PC-based layout on webpage overall layout is remained through keeping a width of a block element unchanged, for example, regional blocks layout of the webpage with PC-based layout is remained. Comparing with prior art where the webpage layout is rearranged completely, such approach reduces data processing tasks and also reduces processing capabilities consumption of the mobile terminal or the processor. The inline element inside the block element wraps onto the next line based on a screen width of the mobile terminal, therefore a regional area (i.e., a regional block) can make adjustment based on a mobile phone screen, thus the contents such as characters within the regional block can be displayed continuously on the mobile phone screen, and the users can read continuous contents without having to scroll left and right. The PC-based layout and the display of the mobile terminal are perfectly combined together, thus ensuring the users to browse the Internet on the mobile terminal more conveniently without changing their browsing habit.

In addition, after utilizing the new layout method provided in the present invention, the mobile terminal may expand some functions to further facilitate users' operations, so as to provide users more convenience to browse webpage. Extended functions may also be added, greatly improving the users' experience.

In order to achieve the above and other related objectives, one or more aspects of the present invention include those features to be described in detail in the followings and particularly pointed out in the claims. The following descriptions and accompanying drawings describe in detail certain illustrative aspects of the present invention. However, these aspects only illustrate some of the ways in which the principle of the present invention can be used. In addition, the present invention intends to include all these aspects and their equivalents.

BRIEF DESCRIPTION OF THE DRAWINGS

By referring to the descriptions of the accompanying drawings, and with a full understanding of the present invention, the above and other purposes, characteristics, and advantages of the present invention can be more clearly and easily understood. In the drawings:

FIG. 3a and FIG. 3b illustrate schematic diagrams of exemplary webpage with PC-based layout displayed on a mobile terminal before and after utilizing the present invention, respectively;

FIG. 4 illustrates a block diagram of an exemplary mobile terminal according to the present invention.

The same label may be used in all drawings to indicate similar or corresponding feature or function.

DETAILED DESCRIPTION

The followings, together with accompanying drawings, describe in detail certain embodiments of the present invention.

It should be noted that the PC-based layout concept in the present invention refers to the layout and display of a WWW webpage which is designed for the PC. In the PC-based layout, HTML elements include block elements and inline elements. The block element is a container element for grouping other elements including inline elements and other block elements. The characteristics of the block element include: the block element usually starts with a new line; height, line-height, and top and bottom margins of the block element can be manipulated; a width of the block element is default to 100% of its container element, unless a width is specified. The inline element may be a semantic-level basic element. The inline element can only contain text or other inline elements. The characteristics of the inline element include: the inline element starts with the same line as other elements; height, line-height and top and bottom margins of the inline element cannot be changed; and the width is the same as the width of the text or image and cannot be changed.

Figure 1:
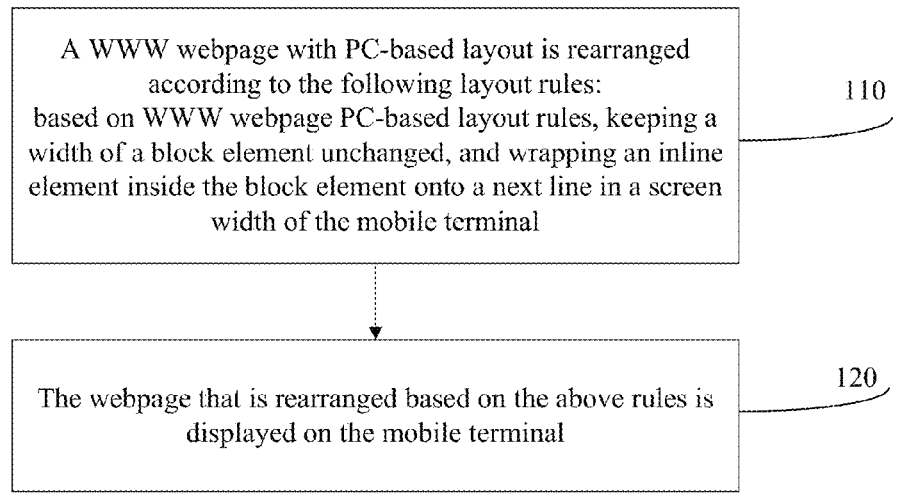
FIG. 1 illustrates a flow chart of an exemplary mobile terminal based webpage layout method a according to the present invention.

FIG. 1 illustrates a flow chart of an exemplary mobile terminal based layout method webpage layout method according to the present invention.

As shown in FIG. 1, when a user needs to browse a WWW webpage with PC-based layout on a mobile terminal (e.g., a mobile phone), the webpage layout needs to be rearranged to adapt to the mobile terminal screen. That is, as show in Step 110, the WWW webpage with PC-based layout is rearranged according to the following layout rules:

Based on WWW webpage PC-based layout rules, keeping a width of a block element unchanged, and wrapping an inline element inside the block element onto a next line in a screen width of the mobile terminal.

Because the webpage layout is rearranged based on the screen width of the mobile terminal, therefore the display of the rearranged webpage can adapt to the screen width of the mobile terminal. In Step 120, the webpage that is rearranged according to the above rules is displayed on the mobile terminal.

Figure 2:
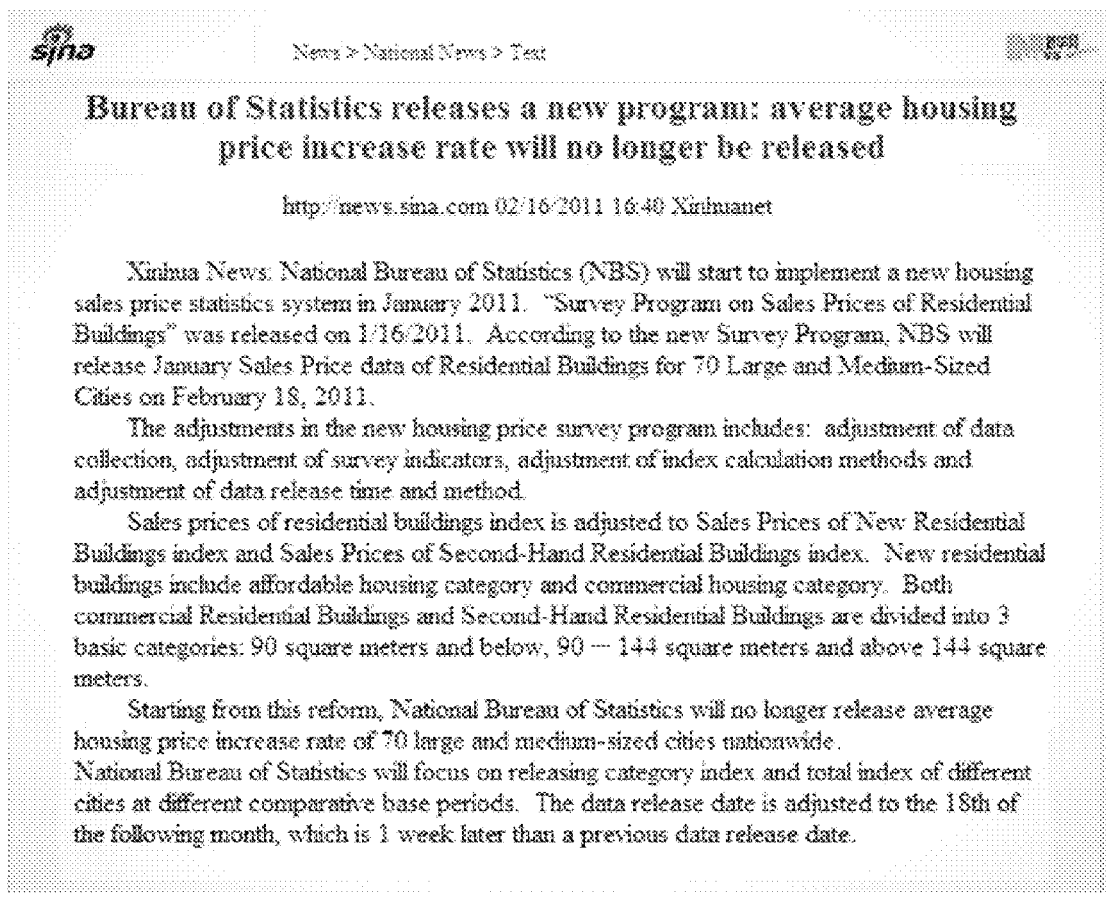
FIG. 2 illustrates a schematic diagram of an exemplary webpage with PC-based layout displayed on a PC.

Because a webpage format of the WWW webpage is layout specifically for PC's display features, the inline element inside the block element wraps onto the next line in the width of the block element. The width of the block element is the width of the PC screen, thus the WWW webpage can be displayed exactly on the PC screen. FIG. 2 illustrates a schematic diagram of an exemplary webpage with PC-based layout displayed on a PC. As shown in FIG. 2, the display of the webpage http://news.sina.com.cn/c/2011-02-16/164021964805.shtml is a display format with PC-based layout.

However, the screen width of the mobile terminal, especially a mobile phone, is far less than the screen width of the PC. If a WWW webpage with the PC-based layout is displayed on the browser of the mobile terminal, a considerable part of webpage content cannot be displayed due to the narrowed screen width. The display effect is shown in FIG. 3a. Based on the above PC-based layout provided in the present invention, the inline element inside the block element wraps onto the next line based on the screen width of the mobile terminal. The PC-based layout basic styles and formats are kept unchanged, and the display of the webpage content matches the screen width of the mobile terminal. The display effect is shown in FIG. 3b. Thus, the layout rearranging method which combines the PC-based layout with the screen width of the mobile terminal not only has no effect on user's webpage browsing experience, but also improves the user's webpage browsing speed due to a relatively small amount of data processing.

In addition, taking into account the small screen of the mobile terminal, in order to further improve webpage display effect on the mobile terminal, the inline elements inside some special block elements still wrap onto the next line in the width of the block element. For example, The value of "white-space" property of a block element is 'nowrap' or 'pre';

The value of "height" property of the block element is less than a preset range, and the value of "overflow" property of the block element is 'hidden';

The value of "height" property of the block element is less than a preset range, and a background image is set;

The value of "position" property of the block element is 'absolute' or 'fixed'; and The value of "float" property of the block element is 'right'.

Further, for the preset value range of "height" property of the block element, if a "line-height" property is set, the preset value range of "height" property of the block element is 1.8 times the line-height; otherwise, the preset value range of "height" property of the block element is 1.8 times the font size.

Moreover, if the inline element inside the block element is text within a form control, the inline element does not wrap onto the next line.

As can be seen from the above examples, when the display effect of a certain part of the webpage does not suitable to wrap text onto the next line in the screen width (e.g., some title bars or navigation bars in a webpage), the PC-based layout rules are kept, and the text wraps onto the next line in the width of the block element or the text does not wrap onto the next line; otherwise, the text wraps onto the next line in the screen width of the mobile terminal, ensuring that the contents that the user wants to browse do not exceed the screen.

Referring to FIGS. 1 to 3, the mobile terminal based webpage layout method according to the present invention is described above. The above-described mobile terminal based webpage layout method can be implemented using software, hardware, or a combination of software and hardware. The method can be implemented on a mobile terminal, and a server other than the mobile terminal.

FIG. 4 illustrates a block diagram of a mobile terminal 400 according to a mobile terminal based webpage layout method of the present invention. As shown in FIG. 4, the mobile terminal 400 includes a webpage layout unit 420 and a display unit 440.

The webpage layout unit 420 is configured to rearrange a WWW webpage with PC-based layout according to the following layout rules:

Based on WWW webpage PC-based layout rules, keeping a width of a block element unchanged, and wrapping an inline element inside the block element onto a next line in a screen width of the mobile terminal.

The display unit 440 is configured to display the webpage that is rearranged by the webpage layout unit 420 on the mobile terminal 400.

Figure 5:
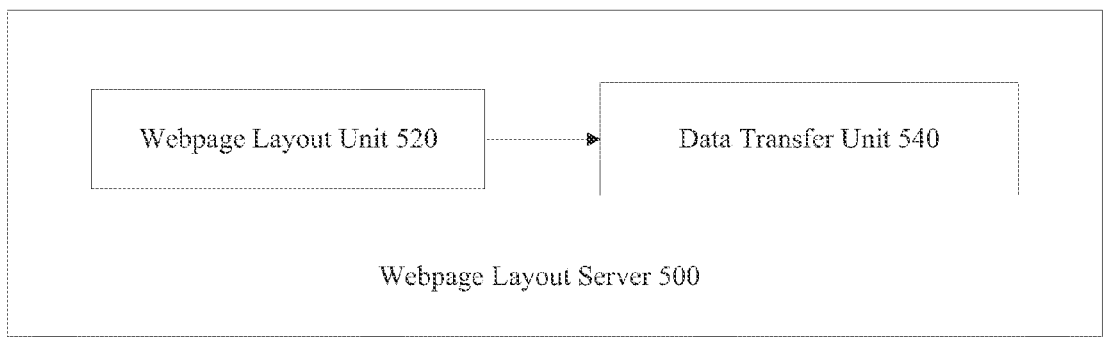
FIG. 5 illustrates a block diagram of an exemplary mobile terminal based webpage layout server according to the present invention.

FIG. 5 illustrates a block diagram of a mobile terminal based webpage layout server 500 according to a mobile terminal based webpage layout method of the present invention. As shown in FIG. 5, the webpage layout server 500 includes a webpage layout unit 520 and a data transfer unit 540.

The webpage layout unit 520 is configured to rearrange a WWW webpage with PC-based layout according to the following layout rules:

Based on WWW webpage PC-based layout rules, keeping a width of a block element unchanged, and wrapping an inline element inside the block element onto a next line in a screen width of the mobile terminal.

The data transfer unit 540 is configured to, based on a webpage browsing request from the mobile terminal, receive a webpage from a third party and send the webpage that is rearranged by the webpage layout unit 520 to the mobile terminal.

The above describes a mobile terminal based webpage layout method and apparatus in reference to the accompanying drawings. But those skilled in the art would understand that various improvements can be made based on the disclosed webpage layout method and apparatus based on the mobile terminal without departing from the contents of the present invention. The scope of the present invention should be defined by the specification, drawings, as well as the attached claims.

What is claimed is:

1. A mobile terminal based webpage layout method, comprising:
    rearranging a WWW (world wide web) webpage with PC (personal computer)-based layout according to the following layout rules:
    based on WWW webpage PC-based layout rules, keeping a width of a block element unchanged,
    when display effect of the WWW webpage is suitable for wrapping in a screen width, wrapping an inline element inside the block element onto a next line in the screen width of the mobile terminal;
    when the display effect of the WWW webpage is not suitable for wrapping onto the next line in the screen width for parts including at least a title bar and a navigation bar in the WWW webpage, wrapping the inline element inside the block element onto the next line in the width of the block element or not wrapping the inline element inside the block element onto the next line;
    when a value of "height" property of the block element is less than a preset range and a background image is set, wrapping the inline element inside the block element onto the next line in the width of the block element,
    when a "line-height" property of the block element is set, the preset value range of "height" property of the block element is a predetermined value times the line-height;
    when the "line-height" property of the block element is not set, the preset value range of "height" property of the block element is a predetermined value times a font size of the block element; and
    displaying the webpage that is rearranged according to the layout rules on the mobile terminal.

2. The method according to claim 1, wherein, when the display effect of the WWW webpage is not suitable for wrapping in the screen width, wrapping the inline element inside the block element onto the next line in the width of block element further includes:
    when a value of a "white-space" property of the block element is 'nowrap' or 'pre', wrapping the inline element inside the block element onto the next line in the width of the block element.

3. The method according to claim 2, wherein:
    according to the mentioned layout rules, the WWW webpage is rearranged on the mobile terminal or an external server.

4. The method according to claim 1, wherein, when the display effect of the WWW webpage is not suitable for wrapping onto the next line in the screen width, wrapping the inline element inside the block element onto the next line in the width of block element further includes:
    when a value of "height" property of the block element is less than a preset range and the value of "overflow" property of the block element is 'hidden', wrapping the inline element inside the block element onto the next line in the width of the block element.

5. The method according to claim 4, wherein:
    according to the mentioned layout rules, the WWW webpage is rearranged on the mobile terminal or an external server.

6. The method according to claim 1, wherein, when the display effect of the WWW webpage is not suitable for wrapping onto the next line in the screen width, wrapping the inline element inside the block element onto the next line in the width of block element further includes:
   when a value of "position" property of the block element is 'absolute' or 'fixed', wrapping the inline element inside the block element onto the next line in the width of the block element.

7. The method according to claim 6, wherein:
   according to the mentioned layout rules, the WWW webpage is rearranged on the mobile terminal or an external server.

8. The method according to claim 1, wherein, when the display effect of the WWW webpage is not suitable for wrapping onto the next line in the screen width, wrapping the inline element inside the block element onto the next line in the width of block element further includes:
   when a value of "float" property of the block element is 'right', wrapping the inline element inside the block element onto the next line in the width of the block element.

9. The method according to claim 8, wherein:
   according to the mentioned layout rules, the WWW webpage is rearranged on the mobile terminal or an external server.

10. The method according to claim 1, further including:
    according to the mentioned layout rules, rearranging the WWW webpage on the mobile terminal or an external server.

11. The method according to claim 1, wherein, when the display effect of the WWW webpage is not suitable for wrapping onto the next line in the screen width, wrapping the inline element inside the block element onto the next line in the width of block element further includes:
    when the inline element inside the block element is text within a form control, not wrapping the inline element onto the next line.

12. The method according to claim 11, wherein:
    according to the mentioned layout rules, the WWW webpage is rearranged on the mobile terminal or an external server.

13. The method according to claim 1, wherein the predetermined value is 1.8.

\* \* \* \* \*